United States Patent
Sekiguchi et al.

(10) Patent No.: US 8,506,696 B2
(45) Date of Patent: *Aug. 13, 2013

(54) ERASABLE LIQUID INK

(75) Inventors: Yumiko Sekiguchi, Yokohama (JP); Kenji Sano, Tokyo (JP); Satoshi Takayama, Kawasaki (JP); Takeshi Gotanda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,167

(22) Filed: Mar. 23, 2012

(65) Prior Publication Data

US 2012/0227623 A1    Sep. 13, 2012

Related U.S. Application Data

(63) Continuation of application No. PCT/JP2009/004829, filed on Sep. 24, 2009.

(51) Int. Cl.
  *C09D 11/02* (2006.01)
(52) U.S. Cl.
  USPC .................................. 106/31.32; 106/31.23
(58) Field of Classification Search
  USPC .......................................... 106/31.32, 31.23
  See application file for complete search history.

(56) References Cited

U.S. PATENT DOCUMENTS

| | | | | |
|---|---|---|---|---|
| 4,028,118 | A * | 6/1977 | Nakasuji et al. | 106/31.19 |
| 4,557,618 | A * | 12/1985 | Iwata et al. | 401/34 |
| 6,203,603 | B1 * | 3/2001 | Takayama et al. | 106/31.16 |
| 6,599,353 | B2 * | 7/2003 | Spencer et al. | 106/31.6 |
| 6,638,620 | B2 * | 10/2003 | Nakashima et al. | 428/402.2 |
| 2010/0021840 | A1 | 1/2010 | Sano et al. | |
| 2012/0266778 | A1* | 10/2012 | Sano et al. | 106/31.32 |

FOREIGN PATENT DOCUMENTS

| | | |
|---|---|---|
| JP | 59-45193 | 3/1984 |
| JP | 60-151094 | 8/1985 |
| JP | 10-17814 | 1/1998 |
| JP | 10-130553 | 5/1998 |
| JP | 11-116880 | 4/1999 |
| JP | 2000-53905 | 2/2000 |
| JP | 2001-220530 | 8/2001 |
| JP | 2002-294104 | 10/2002 |
| JP | 2009-192943 | 8/2009 |

OTHER PUBLICATIONS

International Search Report for International Application No. PCT/JP2009/004829 mailed on Feb. 2, 2010.
Japanese Office Action for Japanese Patent Application No. 2011-532793 mailed on May 7, 2013.

* cited by examiner

*Primary Examiner* — Kaj K Olsen
*Assistant Examiner* — Veronica F Faison
(74) *Attorney, Agent, or Firm* — Turocy & Watson, LLP

(57) ABSTRACT

According to one embodiment, a liquid ink includes a leuco dye, a developer, and a solvent. The developer is selected from

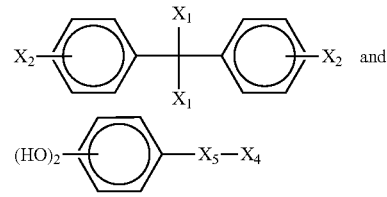

wherein $X_1$ is selected from H and $CH_3$, $X_2$ is selected from H and OH, $X_5$ is selected from $C(CH_3)_2$ and CO, and $X_4$ is selected from phenyl group and alkyl group.

12 Claims, 1 Drawing Sheet

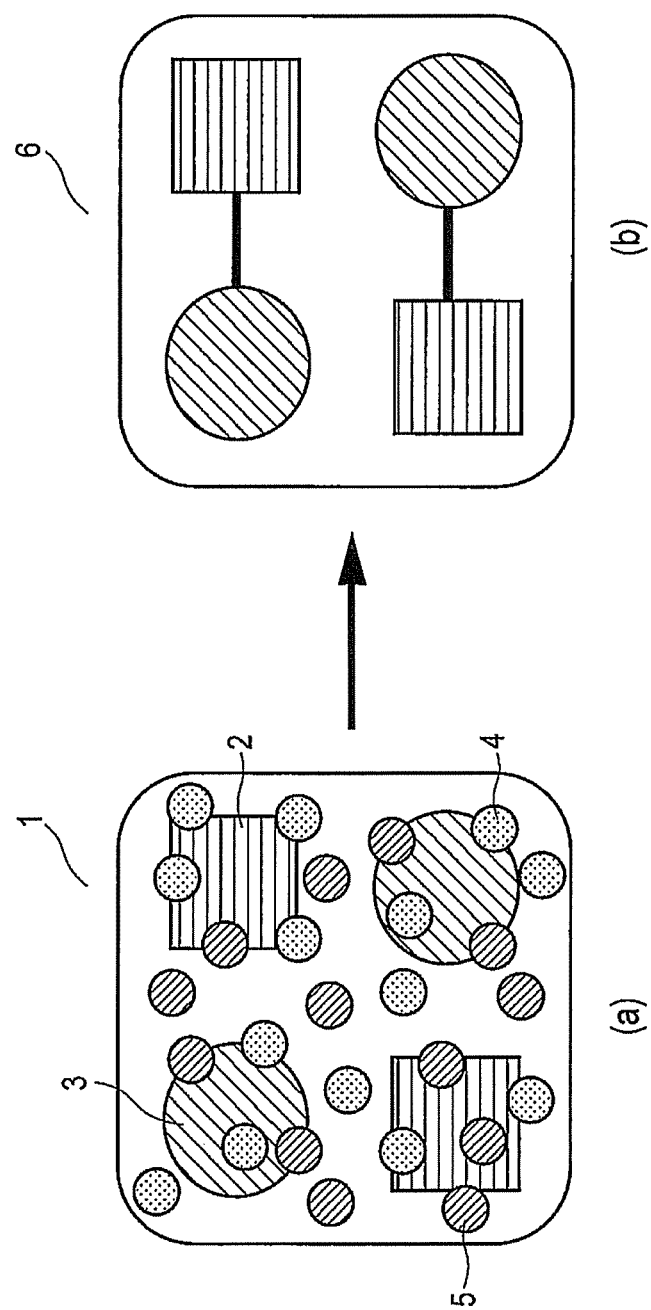

ERASABLE LIQUID INK

CROSS-REFERENCE TO RELATED APPLICATIONS

This application is a Continuation Application of PCT Application No. PCT/JP2009/004829, filed Sep. 24, 2009, the entire contents of which are incorporated herein by reference.

FIELD

Embodiments described herein relate generally to a liquid ink that produces an image which can be decolorized by heating or being contacted with a solvent.

BACKGROUND

An image forming material has been proposed as an effective technology for reusing paper, with which a color-developed state stably persists at a temperature close to room temperature, and also a decolorized state persists for a long period of time at operating temperatures due to a treatment with heat or solvent, by newly adding a decolorizing agent to a composition system containing a leuco dye and a developer.

These image forming materials provide highly stable color-developed/decolorized states for images, and are also highly safe as materials. There are advantages in that they can be applied to electrophotographic toner, liquid ink, ink ribbon and writing utensils, and can be erased by a large-scale processing.

With respect to liquid inks, a decolorizable aqueous ink with a small and uniform particle size and which provides a thick color tone without discoloration has been disclosed (see, for example, JP-A 2002-294104 (KOKAI)).

However, the above-mentioned decolorizable aqueous ink is a pigment particle dispersion-based (emulsion-based) ink, and may induce a clogging of the nozzle when being applied to the ink jet printing. Accordingly, a water-soluble liquid ink which can be applied to the ink jet printing and which also satisfies simultaneously the coloring property of images at the time of printing and the erasing property of images at the time of treatment with heat or solvent has been demanded.

BRIEF DESCRIPTION OF THE DRAWINGS

The single FIGURE is a diagram showing the coloring mechanism of a liquid ink of an embodiment.

DETAILED DESCRIPTION

In general, according to one embodiment, liquid ink comprises a leuco dye, a developer, and a solvent. The developer is selected from

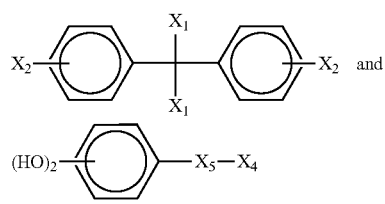

wherein $X_1$ is selected from H and $CH_3$, $X_2$ is selected from H and OH, $X_5$ is selected from $C(CH_3)_2$ and CO, and $X_4$ is selected from phenyl group and alkyl group.

Hereinafter, the components used in an erasable liquid ink of the embodiment will be described below in order of a developer, a leuco dye and a solvent.

<Developer>

First, a coloring mechanism of the liquid ink of the embodiment will be described. As shown in (a) in FIGURE, a liquid ink 1 contains a leuco dye 2, a developer 3, a water-soluble organic solvent 4 and water 5 (hereafter, the water-soluble organic solvent and water will be collectively described as a solvent). Although the leuco dye 2 and the developer 3 are in a liberated state, as the solvent evaporates upon printing or application on a piece of paper or the like, as shown in (b) in FIGURE, the leuco dye 2 and the developer 3 binds each other to develop an image 6. In order to obtain favorable coloring property for the image 6, it is important to rapidly evaporate the solvent after the printing or the like, and to separate the leuco dye 2 and the developer 3 from the solvent and make them bind each other.

The affinity of the leuco dye 2 and the developer 3 to the solvent can be controlled through their selection. That is, by selecting the leuco dye 2 and the developer 3 with low affinity to water 5, the leuco dye 2 and the developer 3 bind rapidly each other to develop a color. Here, because the leuco dye 2 is generally poorly soluble in water 5, the affinity of the developer 3 to water 5 should be considered.

As a result of confirming the affinity of various developers, hydroxybenzophenones, hydroxydiphenylmethanes, and the derivatives thereof each having a hydrophobic aromatic ring in the side chain were found to be preferable.

By having a specific structure represented by the general formulas described above, the developer contained in the erasable liquid ink of the embodiment provides images with high levels of coloring property and erasing property at the time of printing, and also enables the application to ink jet printing. This is due to the fact that the developer exhibits a relatively low affinity to water as described above, and also that the agent itself is colorless and does not develop a color by heating.

Incidentally, in order to obtain sufficient coloring property for images, an excess of the developer is used relative to the leuco dye in the erasable liquid ink of the embodiment, so as to shift the equilibrium reaction shown in the following Formula (1) to the coloring direction (right direction). During image formation, because a relatively large amount of developer is placed on a piece of paper, those developers that are themselves colored, or those that develop colors by heating even if they are themselves colorless are undesirable.

$$L+D \rightleftharpoons LD \qquad \text{Formula (1)}$$

(L:leuco dye D:developer)

From the descriptions above, it became clear that high levels of coloring property and erasing property of images can be achieved at the same time when the developers among those shown in the general formulas above are used, more specifically, in those cases where the developers shown in the following formulas are used.

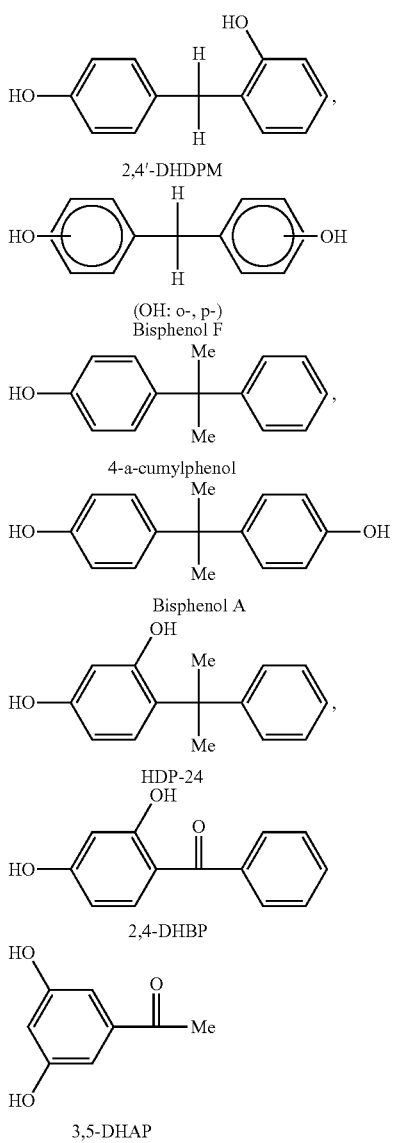

2,4'-DHDPM (OH: o-, p-)
Bisphenol F 4-a-cumylphenol

Bisphenol A

HDP-24

2,4-DHBP 3,5-DHAP

It should be noted that the amount of the developer is preferably 15 mol equivalent or more, relative to the leuco dye. This is for allowing the equilibrium reaction shown in the Formula (1) to proceed further towards the coloring direction in accordance with the law of mass action. If the amount is less than 15 mol equivalent, it is undesirable because sufficient optical color density cannot be obtained. In addition, the amount of the developer is preferably less than the solubility relative to the solvent. This is because when the amount of the developer reaches the solubility relative to the solvent, the developer precipitates during storage of the liquid ink, which triggers the reduction of coloring property, deterioration of the ink ejection performance and the like.

<Leuco Dye>

Examples of the leuco dyes included in the decolorizable liquid ink of the present embodiment include electron-donating organic materials such as diarylphthalides, polyarylcarbinols, rhodamine B lactams, indolines, spiropyrans and fluorans. Specific examples thereof include crystal violet lactone (hereafter, referred to as CVL), 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)fluoran, 2-chrolo-6-(diethylamino)fluoran, 7-(N,N-dibenzylamino)-3-(N,N-diethylamino)fluoran, 3,6-bis(diethylamino)fluoran-γ-(4'-nitro)anilinolactam, 3-diethylaminobenzo[a]-fluoran, 3-diethylamino-6-methyl-7-aminofluoran, 3-diethylamino-7-xylidinofluoran, 3-(4-diethylamino-2-ethoxyphenyl)-3-(1-ethyl-2-methylindol-3-yl)-4-azaphtalide, 3-(4-diethylaminophenyl)-3-(1-ethyl-2-methylindol-3-yl)phtalide, 3-diethylamino-7-chroloanilinofluoran, 3-diethylamino-7,8-benzofluoran, 3,3-bis(1-n-butyl-2-methylindol-3-yl)phtalide, 3,6-dimethylethoxyfluoran, 3-diethylamino-6-methoxy-7-aminofluoran, DEPM, ATP, ETAC, 2-(2-chloroanilino)-6-dibutylaminofluoran, crystal violet carbinol, rhodamine B lactam, 2-(phenyliminoethanedilidene)-3,3-dimethylindoline, N-3,3-trimethylindolinobenzospiropyran, 8'-methoxy-N-3,3-trimethylindolinobenzospiropyran, 3-diethylamino-6-methyl-7-chrolofluoran, 3-diethylamino-7-methoxyfluoran, 3-diethylamino-6-benzyloxyfluoran, 1,2-dibenzo-6-diethylaminofluoran, 3,6-di-p-toluidino-4,5-dimethylfluoran, phenylhydrazide-γ-lactam and 3-amino-5-methylfluoran. A single type of these can be used or two or more types thereof can be mixed for use. If the leuco dye is appropriately selected, because various colors can be developed, it is also easily used in color applications. Among these, particularly suitable materials are triphenylmethane-based leuco dyes, fluoran-based leuco dyes and phenylindole phthalide-based leuco dyes.

<Solvent>

The solvent included in the liquid ink of the present embodiment contains a water-soluble organic solvent and water.

Examples of the water-soluble organic solvents include alcohols, glycols, glycol monoalkyl ethers and glycol dialkyl ethers. Among these, from the viewpoint of the coloring property of images, alcohols and glycol monoalkyl ethers are particularly preferred, and more specifically, ethanol, propylene glycol monomethyl ether, propanol, ethylene glycol-n-butyl ether and ethylene glycol-t-butyl ether are preferred.

The amount of water is preferably equal to or more than 10% by mass, and equal to or less than 40% by mass, relative to the total mass of the solvent. This is because the ink ejection stability clearly drops in the ink-jet printing if the amount is less than 10% by mass. Also, this is because the optical color density reduces significantly if the amount exceeds 40% by mass.

It should be noted that when applied to the ink-jet printing, compounds such as surfactants and glycol ethers can be added as appropriate from the viewpoint of ejection stability and storage stability, if needed.

EXAMPLES

Hereinafter, the present embodiment will be specifically described on the basis of Examples. In addition, the evaluation results of each developer and liquid ink are indicated in Table 1.

Example 1

50 mg (0.12 mmol) of crystal violet lactone (hereafter, referred to as CVL), a leuco dye; 546 mg (2.7 mmol) of 2,4'-dihydroxydiphenylmethane, a developer; 3 g of pure water; and 6 g of propylene glycol monomethyl ether (hereafter, referred to as PGMME), a water-soluble organic solvent, were placed in a screw top vial (20 mL) equipped with a magnetic stirrer, and the resulting mixture was stirred thoroughly at room temperature for 1 hour. A colorless solution was obtained when the resulting suspension was filtered.

Then, the ink-jet printing was carried out using this solution. The DeskJet112C (manufactured by Hewlett-Packard Japan, Ltd.) was used as an ink-jet printer. The ink-jet ejection performance was extremely stable without clogging.

The optical color density of the obtained image was calculated in the following manner. The reflectance of the solid image was measured using a color difference meter (CR-300; manufactured by Konica Minolta Holdings, Inc.), and this was converted to the optical color density by using the following Formula (2). The optical color density obtained in this manner was as high as 0.40 (including the background density of 0.091).

$$\text{Optical color density} = \log_{10}(1/\text{reflectance}) \quad \text{Formula (2)}$$

Then, the image was heated for 60 minutes in a thermostatic bath of 130° C., and the color difference relative to the background color of the obtained ghost image was calculated. The color difference refers to the distance in the color space of the La*b* color system of two certain colors and can be determined by the following Formula (3). With the erasable liquid ink of the embodiment, a clear correlation was established between the color difference relative to the background color of the ghost image and the degree of recognition of a visual ghost image. For this reason, the color difference relative to the background color of the ghost image was used as an indicator of erasing property. The color difference of the ghost image calculated from the following Formula (3) was as small as 0.28, and the ghost image was visually unrecognizable.

$$\text{Color difference} = \sqrt{\{(\Delta L)^2 + (\Delta a^*)^2 + (\Delta b^*)^2\}} \quad \text{Formula (3)}$$

Example 2

The same operation as in Example 1 was carried out with the exception that 500 mg (2.3 mmol) of 2,4-dihydroxybenzophenone was used as a developer. The resulting solution was pale blue.

When the ink-jet printing was carried out using this solution, the ink-jet ejection performance was extremely stable without clogging. The resulting optical color density was as high as 0.37 (including the background density of 0.090).

In addition, the color difference relative to the background color of the ghost image obtained in the same manner as in Example 1 was calculated in accordance with the Formula (3). The obtained color difference was as small as 2.0, and the ghost image was visually unrecognizable.

Examples 3 to 7

The same operation as in Example 1 was carried out by using 4-a-cumyl phenol, bisphenol F, bisphenol A, HDP-24 and 3,5-dihydroxyacetophenone as a developer, respectively.

It was confirmed that the obtained liquid ink exhibited high values for both coloring property and erasing property, as indicated in Table 1.

Comparative Example 1

The same operation as in Example 1 was carried out with the exception that 500 mg (2.5 mmol) of 2,4-dihydroxydiphenylmethane was used as a developer. The resulting solution was pale orange.

When the ink-jet printing was carried out using this solution, the ink-jet ejection performance was stable. The resulting optical color density was as high as 0.43 (including the background density of 0.084).

However, when the color difference relative to the background color of the ghost image obtained in the same manner as in Example 1 was calculated in accordance with the Formula (3), the obtained color difference was as large as 13 and the ghost image was easily recognizable visually.

Comparative Example 2

The same operation as in Example 1 was carried out with the exception that 500 mg (2.7 mmol) of 4,4'-biphenyl was used as a developer. The resulting solution was pale blue.

When the ink-jet printing was carried out using this solution, the ink-jet ejection performance was stable. However, the obtained optical color density was as low as 0.11 (including the background density of 0.086).

In addition, the color difference relative to the background color of the ghost image obtained in the same manner as in Example 1 was calculated in accordance with the Formula (3). The obtained color difference was as small as 0.72, and the ghost image was visually unrecognizable.

Comparative Example 3

The same operation as in Example 1 was carried out with the exception that 500 mg (2.5 mmol) of ethyl-3,4,5-trihydroxybenzoate was used as a developer. The resulting solution was blue.

When the ink-jet printing was carried out using this solution, the ink-jet ejection performance was stable. The resulting optical color density was relatively high as 0.31 (including the background density of 0.093).

However, when the color difference relative to the background color of the ghost image obtained in the same manner as in Example 1 was calculated in accordance with the Formula (3), the obtained color difference was as large as 3.25 and the ghost image was easily recognizable visually.

Comparative Examples 4 to 10

Although the same operation as in Example 1 was carried out by using 2,6-dihydroxyacetophenone, 2,4'-dihydroxybenzophenone, HDM-2244, 3,4-dihydroxybenzophenone, 2,2',4,4'-tetrahydroxybenzophenone, 2,3,4,4'-tetrahydroxybenzophenone and 4-hydroxybenzophenone as a developer, respectively, high levels of coloring property and erasing property were not achieved at the same time.

TABLE 1

|  |  | Optical color density | Coloring property | Color difference | Erasing property | Developer/ dye molar ratio |
|---|---|---|---|---|---|---|
| Ex. 1 | 2,4'-dihydroxydiphenylmethane | 0.40 | ⊚ | 0.28 | ⊚ | 22.7 |
| Ex. 2 | 2,4-dihydroxybenzophenone | 0.38 | ○ | 1.98 | ○ | 19.4 |

TABLE 1-continued

| | | Optical color density | Coloring property | Color difference | Erasing property | Developer/ dye molar ratio |
|---|---|---|---|---|---|---|
| Ex. 3 | 4-a-cumylphenol | 0.33 | ○ | 0.26 | ⊙ | 19.6 |
| Ex. 4 | Bisphenol F | 0.41 | ⊙ | 0.38 | ⊙ | 20.8 |
| Ex. 5 | Bisphenol A | 0.40 | ⊙ | 0.45 | ⊙ | 18.2 |
| Ex. 6 | HDP-24 | 0.37 | ○ | 0.65 | ⊙ | 18.2 |
| Ex. 7 | 3,5-dihydroxyacetophenone | 0.30 | ○ | 2.17 | ○ | 27.3 |
| Comp. Ex. 1 | 2,4-dihydroxydiphenylmethane | 0.43 | ⊙ | 13.33 | X | 20.8 |
| Comp. Ex. 2 | 4,4'-dihydroxybiphenol | 0.11 | X | 0.72 | ⊙ | 22.3 |
| Comp. Ex. 3 | Ethyl-3,4,5-trihydroxybenzoate | 0.31 | ○ | 3.25 | X | 21.0 |
| Comp. Ex. 4 | 2,6-dihydroxyacetophenone | 0.17 | X | 5.85 | X | 27.3 |
| Comp. Ex. 5 | 2,4'-dihydroxybenzophenone | 0.36 | ○ | 8.15 | X | 19.4 |
| Comp. Ex. 6 | HDM-2244 | 0.34 | ○ | 9.15 | X | 17.9 |
| Comp. Ex. 7 | 3,4-dihydroxybenzophenone | 0.32 | ○ | 11.29 | X | 19.4 |
| Comp. Ex. 8 | 2,2',4,4'-tetrahydroxybenzophenone | 0.34 | ○ | 14.92 | X | 16.9 |
| Comp. Ex. 9 | 2,3,4,4'-tetrahydroxybenzophenone | 0.35 | ○ | 15.26 | X | 16.9 |
| Comp. Ex. 10 | 4-hydroxybenzophenone | 0.15 | X | 0.13 | ⊙ | 21.0 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ink comprising:
   a leuco dye;
   a developer selected from

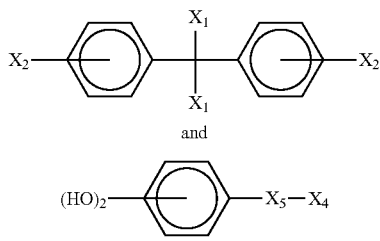

wherein $X_1$ is selected from H and $CH_3$, $X_2$ is selected from H and OH, $X_5$ is selected from $C(CH_3)_2$ and CO, and $X_4$ is selected from phenyl group and alkyl group; and
   a solvent, the solvent comprising a water-soluble organic solvent and water, the water-soluble organic solvent being selected from the group consisting of alcohols, glycols, glycol monoalkyl ethers, and glycol dialkyl ethers and the water accounting for 10 to 40% of a total mass of the solvent.

2. The ink according to claim 1, wherein the developer is selected from the group consisting of

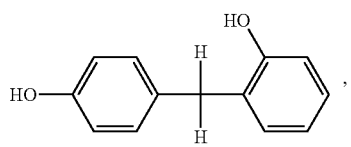

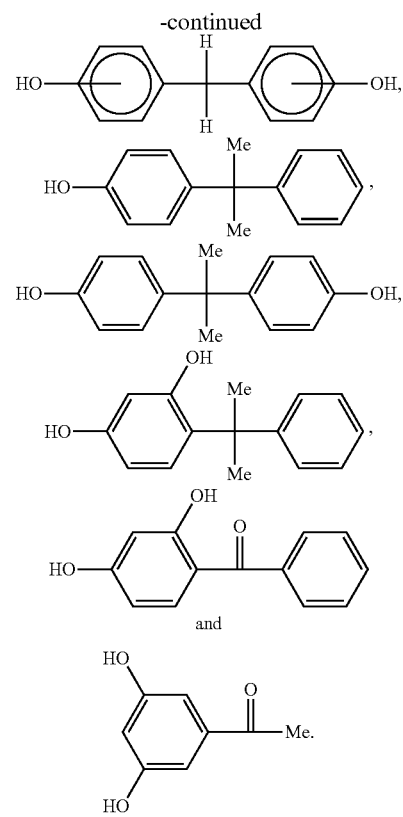

3. The ink according to claim 1, wherein, an amount of the developer is 15 mol equivalent or more relative to the leuco dye.

4. The ink according to claim 1, wherein the leuco dye is selected from the group consisting of diarylphthalides, polyarylcarbinols, rhodamine B lactams, indolines, spiropyrans and fluorans.

5. The ink according to claim 4, wherein the leuco dye is selected from the group consisting of triphenylmethane-based leuco dyes, fluoran-based leuco dyes and phenylindole phthalide-based leuco dyes.

6. The ink according to claim 1, further comprising a surfactant.

7. The ink according to claim 1, further comprising glycol ether.

8. The ink according to claim 1, wherein the water-soluble organic solvent is selected from the group consisting of ethanol, propylene glycol monomethyl ether, propanol, ethylene glycol-n-butyl ether, and ethylene glycol-t-butyl ether.

9. The ink according to claim 1, further comprising a surfactant.

10. The ink according to claim 1, further comprising glycol ether.

11. An ink for inkjet printing comprising a liquid ink according to claim 1.

12. An ink for inkjet printing comprising a liquid ink according to claim 1.

* * * * *